(12) United States Patent
Parker et al.

(10) Patent No.: US 10,517,309 B2
(45) Date of Patent: Dec. 31, 2019

(54) METHOD FOR PROCESSING VEGETABLES

(71) Applicant: Cauli-Rice Limited, London (GB)

(72) Inventors: Nigel Parker, Chichester (GB); Joanna Misa-Harris, London (GB)

(73) Assignee: FULLGREEN LTD, London (GB)

( * ) Notice: Subject to any disclaimer, the term of this patent is extended or adjusted under 35 U.S.C. 154(b) by 0 days.

(21) Appl. No.: 16/215,092

(22) Filed: Dec. 10, 2018

(65) Prior Publication Data

US 2019/0174781 A1   Jun. 13, 2019

Related U.S. Application Data

(63) Continuation of application No. 15/037,629, filed as application No. PCT/EP2014/074894 on Nov. 18, 2014, now Pat. No. 10,194,671.

(30) Foreign Application Priority Data

Nov. 19, 2013  (GB) .................................. 1320418.5

(51) Int. Cl.

| | | |
|---|---|---|
| *A23B 7/152* | (2006.01) | |
| *A23L 3/01* | (2006.01) | |
| *A23L 3/005* | (2006.01) | |
| *A23L 3/10* | (2006.01) | |
| *A23L 3/358* | (2006.01) | |
| *A23L 3/3445* | (2006.01) | |
| *A23B 7/157* | (2006.01) | |
| *A23L 5/10* | (2016.01) | |
| *A23L 5/20* | (2016.01) | |

(52) U.S. Cl.
CPC .............. *A23B 7/152* (2013.01); *A23B 7/157* (2013.01); *A23L 3/005* (2013.01); *A23L 3/01* (2013.01); *A23L 3/10* (2013.01); *A23L 3/3445* (2013.01); *A23L 3/358* (2013.01); *A23L 5/10* (2016.08); *A23L 5/13* (2016.08); *A23L 5/15* (2016.08); *A23L 5/276* (2016.08)

(58) Field of Classification Search
CPC . A23B 7/152; A23B 7/157; A23L 5/15; A23L 5/13; A23L 5/10; A23L 3/3445; A23L 3/005; A23L 3/358; A23L 3/10; A23L 3/01

See application file for complete search history.

(56) References Cited

U.S. PATENT DOCUMENTS

| 6,045,846 A | * | 4/2000 | Bautista | A23B 7/00 422/33 |
|---|---|---|---|---|
| 6,387,430 B1 | * | 5/2002 | Gillette | A23L 3/165 426/407 |
| 7,008,659 B1 | * | 3/2006 | Ono | A23L 3/10 426/412 |
| 2004/0262301 A1 | * | 12/2004 | Young | B65D 81/3446 219/731 |
| 2005/0217504 A1 | * | 10/2005 | Walker | A23L 3/02 99/483 |
| 2011/0256277 A1 | * | 10/2011 | Bows | A23P 30/32 426/242 |
| 2013/0065959 A1 | * | 3/2013 | Ho | A23B 4/20 514/557 |
| 2013/0183420 A1 | * | 7/2013 | Shimek | A23B 7/005 426/326 |
| 2014/0272042 A1 | * | 9/2014 | Gillette | A23L 3/00 426/392 |

FOREIGN PATENT DOCUMENTS

| AU | 2011298761 | * | 10/2014 |
|---|---|---|---|
| JP | 10-271968 | * | 10/1998 |

OTHER PUBLICATIONS

Shiobara JP 10-271968, Oct. 1998, Translation. (Year: 1998).*

* cited by examiner

*Primary Examiner* — Viren A Thakur
*Assistant Examiner* — Chaim A Smith
(74) *Attorney, Agent, or Firm* — Haugen Law Firm PLLP

(57) ABSTRACT

A method for processing vegetables to reduce unpleasant odor and/or taste, and/or to minimize discoloration, deterioration, degradation, or rot over a period of storage time is described. The method includes:
  i) subjecting the vegetable to mechanical size reduction;
  ii) heating or freezing the vegetable for a pre-determined period; and
  iii) bringing the softened vegetable product into contact with one or more reactive oxygen species selected from: peroxides; superoxides; and ozone.

12 Claims, No Drawings

METHOD FOR PROCESSING VEGETABLES

CROSS-REFERENCE TO RELATED APPLICATIONS

This application is a continuation of U.S. patent application Ser. No. 15/037,629, filed May 18, 2016, entitled "Method for Processing Vegetables", itself a United States national phase application under 35 U.S.C. § 371 of International Application Serial No. PCT/EP2014/074894, filed on Nov. 18, 2014 and entitled "Method for Processing Vegetables", which claims priority to European Application Serial No. 1320418.5, filed on Nov. 19, 2013, the contents of each of which being incorporated herein in their entirety.

FIELD OF THE INVENTION

The present invention relates to a method for processing vegetables, in particular cauliflower.

BACKGROUND OF THE INVENTION

Cauliflower is one of several vegetables in the species *Brassica oleracea*, in the family Brassicaceae. It is an annual plant that reproduces by seed. Typically, only the head (the white curd) is eaten. The cauliflower head is composed of a white inflorescence meristem. Cauliflower heads resemble those in broccoli, which differs in having flower buds. Its name is from Latin 'caulis' (cabbage) and flower. *Brassica oleracea* also includes cabbage, brussels sprouts, kale, broccoli, and collard greens, though they are of different cultivar groups.

There are four major groups of cauliflower (Crisp, P. (1982). "The use of an evolutionary scheme for cauliflowers in screening of genetic resources". *Euphytica* 31 (3): 725).
Italian Diverse in appearance, and biennial and annual in type, this group includes white, Romanesco, various green, purple, brown and yellow cultivars. This type is the ancestral form from which the others were derived.
Northwest European Biennial Used in Europe for winter and early spring harvest, this was developed in France in the 19th century, and includes the old cultivars Roscoff and Angers.
Northern European Annuals Used in Europe and North America for summer and autumn harvest, it was developed in Germany in the 18th century, and includes the old cultivars Erfurt and Snowball.
Asian A tropical cauliflower used in China and India, it was developed in India during the 19th century and includes old varieties Early Patna and Early Benaras.

There are hundreds of historic and current commercial varieties used around the world.

Cauliflowers are available in different colours:
i. White, which is the most common colour of cauliflower.
ii. Orange (*B. oleracea* L. var. *botrytis*) which contains 25% more vitamin A than white varieties. This trait came from a natural mutant found in a cauliflower field in Canada (Dickson, M. H., Lee C. Y., Blamble A. E. (1988), "Orange-curd high carotene cauliflower inbreds, NY 156, NY 163, and NY 165". *HortScience* 23: 778-779). Cultivars include 'Cheddar' and 'Orange Bouquet'.
iii. Green cauliflower, of the *B. oleracea botrytis* group, is sometimes called broccoflower. It is available both with the normal curd shape and a variant spiky curd called Romanesco broccoli. Both types have been commercially available in the U.S. and Europe since the early 1990s. Green-curded varieties include 'Alverda', 'Green Goddess' and 'Vorda'. Romanesco varieties include 'Minaret' and 'Veronica'.
iv. Purple cauliflower, the colour of which is caused by the presence of the antioxidant group anthocyanins, which can also be found in red cabbage and red wine (Chiu, L., Prior, R. L., Wu, X., Li, L. (Jul. 16, 2005), "Toward Identification of the Candidate Gene Controlling Anthocyanin Accumulation in Purple Cauliflower (*Brassica oleracea* L. var. *botrytis*)". American Society of Plant Biologists Annual Meeting. p. 628). Varieties include 'Graffiti' and 'Purple Cape'. In Great Britain and southern Italy, a broccoli with tiny flower buds is sold as a vegetable under the name "purple cauliflower". However, it is not the same as cauliflower with a purple curd.

Cauliflower is low in fat, low in carbohydrates but high in dietary fiber, folate, water, and vitamin C. It possesses a high nutritional density. Approximate nutritional data is provided in Table 1

TABLE 1

Nutritional data for cauliflower
Nutritional value per 100 g (3.5 oz)

| | |
|---|---|
| Energy | 104 kJ (25 kcal) |
| Carbohydrates | 5 g |
| Sugars | 1.9 g |
| Dietary fiber | 2 g |
| Fat | 0.3 g |
| Protein | 1.9 g |
| Water | 92 g |
| Thiamine (vit. $B_1$) | 0.05 mg (4%) |
| Riboflavin (vit. $B_2$) | 0.06 mg (5%) |
| Niacin (vit. $B_3$) | 0.507 mg (3%) |
| Pantothenic acid ($B_5$) | 0.667 mg (13%) |
| Vitamin $B_6$ | 0.184 mg (14%) |
| Folate (vit. $B_9$) | 57 µg (14%) |
| Vitamin C | 48.2 mg (58%) |
| Vitamin E | 0.08 mg (1%) |
| Vitamin K | 15.5 µg (15%) |
| Calcium | 22 mg (2%) |
| Iron | 0.42 mg (3%) |
| Magnesium | 15 mg (4%) |
| Manganese | 0.155 mg (7%) |
| Phosphorus | 44 mg (6%) |
| Potassium | 299 mg (6%) |
| Sodium | 30 mg (2%) |
| Zinc | 0.27 mg (3%) |

Cauliflower contains several phytochemicals, common in the cabbage family, that may be beneficial to human health, such as sulforaphane (Liu, R H (2004) "Potential synergy of phytochemicals in cancer prevention: mechanism of action", *The Journal of nutrition* 134 (12 Suppl): 3479S-3485S). A high intake of cauliflower has been associated with reduced risk of aggressive prostate cancer (Kirsh V A, Peters U, Mayne S T, Subar A F, Chatterjee N, Johnson C C, Hayes R B (2007), "Prospective study of fruit and vegetable intake and risk of prostate cancer, *Journal of the National Cancer Institute* 99 (15): 1200-9).

Cauliflower can be roasted, boiled, fried, steamed, microwaved or eaten raw. Steaming or microwaving better preserves the potential anti cancer compounds than boiling (Warwick Medical School, University of Warwick (2007 May 15). "Research Says Boiling Broccoli Ruins Its Anti Cancer Properties", http://www2.warwick.ac.uk/newsand-events/pressreleases/research_says_boiling/). Boiling reduces the levels of these compounds, with losses of 20-30% after five minutes, 40-50% after ten minutes, and 75% after thirty minutes. However, other preparation methods, such as steaming, microwaving, and stir frying, have no significant effect on the compounds. When cooking, the outer leaves and thick stalks are removed, leaving only the florets. The leaves are also edible, but are most often discarded. The florets should be broken into similar-sized pieces so they are cooked evenly.

Cauliflower may be used as a substitute for rice. Whilst cauliflower can produce a similar texture, or mouth feel to rice, it lacks the starch. Owing to the low fat, low carbohydrate and high nutrient properties of cauliflower, this is particularly relevant for those restricting dietary intake of carbohydrate, fat and/or calories or increasing dietary intake of phytochemicals. Typically, fresh cauliflower curd is processed until it is the size of rice, either using a food processor, a hand-held grater, or a knife. This rice-like cauliflower is then cooked using conventional methods to produce a cooked, rice-like cauliflower derived product, hereinafter "cauliflower rice".

However, it is a problem with known methods for producing cauliflower rice that as soon as the product is produced, it subsequently begins to discolour and produce odorous volatile chemicals which are undesirable for the consumer. The product is therefore unsuitable for prolonged storage.

Cooked white cauliflower curds begin to discolour to a variety of colours from tan to pink. The colouration is attributed to the expression of carotene, chlorophyll and anthocyanins precursors which are present in orange, green, and purple cauliflower varieties from genes which are dormant in white cauliflower prior to cooking.

It is also known that the black discolouration which may be observed in processed cauliflower is attributable to the interaction between polyphenolic compounds in the cells, in particular flavonols, with an external source of metal ions. Cell wall destruction is found to be necessary for the interaction (Advances in Food Research, Volume 19, Emil Marcel Mrak, C. O. Chichester, George Franklin Stewart, Academic Press, 29 Oct. 1971).

The characteristic odour associated with cooked cauliflower is associated with the decomposition products of glucosinolates. These include alkyl cyanides such as 4-(methylthio)butyl cyanide and 4-(methylthio)butyl isothiocyanate from glucoerucin and 3-(methylthio)propylcyanide and 3-(methylthio)propylisothiocyanate from glucoiberverin.

Some people find the odour and/or taste of certain vegetables to be unpleasant. Accordingly, a vegetable-based product that has a reduced odour and/or taste would be advantageous. Additionally or alternatively, a vegetable-based product that does not discolour or otherwise deteriorate, degrade or rot for a period of time upon storage would also be advantageous.

SUMMARY OF THE INVENTION

According to a first aspect of the invention, there is provided a method for processing vegetables, comprising:
i) a dicing step comprising subjecting the vegetable to mechanical size reduction;
ii) a softening step comprising heating or freezing the vegetable for a pre-determined period; and
iii) a treatment step comprising bringing the softened vegetable product into contact with one or more reactive oxygen species selected from: peroxides; superoxides; and ozone.

The dicing step suitably reduces the size of the vegetable to cereal grain sized granules. Suitably, the granules are rice-sized. In other words, the granules suitably have a long axis and a short axis and the long axis of the granules suitably has an average length of about 1 to about 10 mm. In the context of the present invention, the diced vegetable may be said to have an average granule size of 1 to 10 mm. In an embodiment of the invention, the diced vegetable has an average granule size of 3 to 8 mm. This allows the vegetable product to function as a rice substitute.

It is the purpose of the softening step to open the fibres of the vegetable in order to allow penetration of the reactive oxygen species into the diced vegetable product. Thus, the softening step increases the permeability of the diced vegetable product. In one embodiment, the softening step comprises heating the diced vegetable product for a pre-determined period. In an alternative embodiment, the softening step comprises freezing the diced vegetable product for a pre-determined period.

It will be appreciated that the purpose of the softening step is to make the vegetable product more permeable to the reactive oxygen species. The time required to complete the softening step will therefore depend on the method of heating or freezing and the size of individual vegetable granules following the dicing step. Thus, diced vegetable particles having an average granule size which is relatively small (e.g. 5 mm) will require less time being subjected to the softening step than diced vegetable particles having a relatively larger average granule size (e.g. 10 mm).

In one embodiment the softening step comprises one or more conventional cooking methods such as baking, boiling, frying, steaming, blanching and/or microwaving. The softening step may be carried out at standard atmospheric pressure (i.e. 1 atmosphere) or it may be carried out at a pressure which is greater than or less than atmospheric pressure.

The heating method used to soften the diced vegetable product will also affect the time required for the softening step to be completed. For example, for a given average granule size, a diced vegetable product which is steamed at atmospheric pressure would typically require a longer softening step than a diced vegetable product which is steamed at a pressure that is greater than atmospheric pressure.

In a further embodiment, the softening step comprises dry frying. In a yet further embodiment the softening step comprises batch dry frying. In a yet further embodiment batch dry frying is effected using a reversible vibratory conveyor with variable frequency, fitted with a non stick heated ceramic bed. It is advantage of this particular embodiment that it results in highly uniform cooking of the product and the conveyor is able to deliver the softened vegetable product directly to the treatment step.

In a further embodiment, the softening step comprises blanching. In a yet further embodiment the softening step comprises batch blanching.

In an alternative embodiment wherein the softening step comprises freezing the vegetable for a pre-determined period, the softening step may be carried out at standard atmospheric pressure (i.e. 1 atmosphere) or it may be carried out at a pressure which is greater than or less than atmospheric pressure, in particular at a pressure which is less than atmospheric pressure.

For the avoidance of doubt, the skilled person will appreciate that in this specification, the term "reactive oxygen species" means chemically reactive molecules containing oxygen including peroxides, superoxides, ozone and hydroxyl.

In the present invention, the one or more reactive oxygen species is selected from: peroxides; superoxides; and ozone. Suitably, the one or more reactive oxygen species is selected from peroxides and superoxides.

In one embodiment, the reactive oxygen species is hydrogen peroxide

Suitably, the reactive oxygen species is in the form of a solution. Solution forms of reactive oxygen species are well known, although in some cases, the reactive oxygen species has a relatively short life in solution before it breaks down into degradation products. Thus, the process may include the step of preparing a solution of a reactive oxygen species prior to the treatment step.

In one embodiment the treatment step comprises bringing the softened vegetable product into contact with hydrogen peroxide solution. The softened vegetable product is suitably treated with the reactive oxygen species for a time sufficient for the reactive oxygen species to penetrate substantially the entire vegetable granule.

The vegetable is suitably washed prior to the dicing step. Thus, the method of the invention may include a washing step. The washing step may include contacting the vegetable product with a solution containing an antimicrobial agent. The antimicrobial agent may comprise a single antimicrobial compound or it may include a combination of two or more antimicrobial compounds.

In embodiments where the antimicrobial agent may have a negative or deleterious effect on the taste of the resultant product, the washing step may include a rinsing step.

The method may further include a cooking or pre-cooking step in which the treated vegetable product is cooked or partially cooked. In such embodiments, the method suitably also includes a cooling step to stop the cooking process. The cooling step may be a rapid cooling step in which the temperature of the treated product is rapidly reduced in order to cease immediately the cooking process.

The cooking or pre-cooking step may be carried out for a pre-determined period. Thus, the treated product is heated to a temperature and then maintained at that temperature for the time of the cooking or pre-cooking step. It will be appreciated that the time required to the cooking or pre-cooking step will depend upon the extent to which the product is intended to be cooked (completely cooked or partially cooked) and also on the cooking temperature.

In an embodiment of the invention, the method includes a packaging step in which the product is placed within a food grade package. In this embodiment, the amount of the product placed within each package may be determined by weight or volume. Thus, a pre-determined weight of the treated product may be placed within a package during the packaging step or a pre-determined volume of the treated vegetable product may be placed within the package. The package is suitably sealed after the treated vegetable product is located therein.

In one embodiment, the method includes a packaging step in which the treated vegetable product is placed in a retort pouch and the pouch is sealed after the product is located therein. A retort pouch is a type of food packaging created by aseptic processing, made from multiple layers of flexible laminate, allowing for the sterile packaging of a wide variety of food and drink. A retort pouch is typically a plastic and metal foil laminate pouch that is used as an alternative to traditional industrial canning methods.

In embodiments in which the method includes both a cooking or pre-cooking step and a packaging step, the cooking step may occur prior to the packaging step or the packaging step may occur prior to the cooking (or pre-cooking) step. Furthermore, in embodiments in which the packaging step is carried out before the cooking step, the package may be sealed either before the cooking step or after the cooking step. Thus, the treated vegetable product may be cooked within a sealed package or it may be cooked in an open package which is then sealed.

In one embodiment, the treated vegetable product is sealed into a retort pouch; the pouch is then heated to 100-150° C., in particular 115-125° C., for several minutes at elevated pressure, inside a retort machine or autoclave machine. The food inside is cooked, similar to pressure cooking. This process reliably kills commonly occurring microorganisms (particularly *Clostridium botulinum*), preventing it from spoiling. This packaging process is very similar to canning, except that the package itself is flexible. In an alternative embodiment, the treated vegetable product is sealed into a metal can; the can is then heated to 100-150° C., in particular 115-125° C., for several minutes at elevated pressure.

Suitably, the method relates to processing cauliflower to prepare cauliflower rice. Thus, the vegetable may be cauliflower, suitably cauliflower heads or florets.

According to a second aspect, the present invention provides a processed vegetable product prepared according to a method of the invention. In an embodiment of the second aspect of the invention, the processed vegetable is cauliflower. In a further embodiment, the processed vegetable product is cauliflower rice.

DETAILED DESCRIPTION OF THE PREFERRED EMBODIMENTS

An embodiment of the invention will now be described, by way of example only:

A method for preparing cauliflower rice comprising the following steps:
i) basic hand preparation to trim, remove damaged material and reduce the raw material to half curd heads of cauliflower. This step ensures that undamaged cauliflower material at a convenient size proceeds to the next step.
ii) immersion of half curd heads of cauliflower in a solution of sodium hypochlorite at approximately 150 ppm available chlorine, with contact time of 30 minutes. The sodium hypochlorite solution is an antimicrobial agent.
iii) removal of half curd heads from the sodium hypochlorite solution with draining under temperature controlled conditions of 2° C. to 5° C. for 12 hours. This step removes the sodium hypochlorite and prevents degradation of the cauliflower material prior to the dicing step.
iv) mechanical size reduction to cereal grain size granules. These suitably have an average granule length of between 1 and 10 mm, suitably 3-8 mm, where the length is determined by the longest dimension of the granule.
v) batch dry frying of the granular product to a uniform 85° C. over a period of 240 seconds. This softens the cellular structure of the cauliflower granules to increase permeability.
vi) immediate batch immersion of the dry-fried product in a 0.5% solution of hydrogen peroxide, with a contact time of 10 minutes. This step treats the cauliflower granules to prevent or minimise subsequent discolouration and to reduce the characteristic cauliflower smell and taste.

vii) removal of product from hydrogen peroxide solution
viii) rinsing or agitated soaking of product in water for 30 minutes. This step removes the hydrogen peroxide.
ix) centrifuge or spin dry and store under temperature controlled conditions of 2° C. to 5° C. for 6 hours
x) automated filling and sealing into retort pouches at 250 g
xi) retort cooking at 121° C. and 15 psi above atmospheric pressure for 172 seconds
xii) removal of pouches from retort
xiii) immediate rapid cooling in chilled water to stop cooking process.

A further embodiment of the invention will now be described, by way of example only:

A method for preparing cauliflower rice comprising the following steps:
i) basic hand preparation to trim, remove damaged material and reduce the raw material to half curd heads of cauliflower. This step ensures that undamaged cauliflower material at a convenient size proceeds to the next step.
ii) immersion of half curd heads of cauliflower in a solution of sodium hypochlorite at approximately 150 ppm available chlorine, with contact time of 30 minutes. The sodium hypochlorite solution is an antimicrobial agent.
iii) removal of half curd heads from the sodium hypochlorite solution with draining under temperature controlled conditions of 2° C. to 5° C. for 12 hours. This step removes the sodium hypochlorite and prevents degradation of the cauliflower material prior to the dicing step.
iv) mechanical size reduction to cereal grain size granules. These suitably have an average granule length of between 1 and 10 mm, suitably 3-8 mm, where the length is determined by the longest dimension of the granule.
v) batch blanching of the granular product to a uniform temperature, depending on season and variety, of between 57.0° C. and 63.5° C., with a contact period of 210 seconds. This softens the cellular structure of the cauliflower granules to increase permeability
vi) immediate batch immersion of the blanched product in a 0.5% solution of hydrogen peroxide, with a contact time of 10 minutes. This step treats the cauliflower granules to prevent or minimise subsequent discolouration and to reduce the characteristic cauliflower smell and taste.
vii) removal of product from hydrogen peroxide solution
viii) rinsing or agitated soaking of product in water for 30 minutes. This step removes the hydrogen peroxide.
ix) centrifuge or spin dry and store under temperature controlled conditions of 2° C. to 5° C. for 6 hours
x) automated filling and sealing into retort pouches at 250 g
xi) retort cooking at 121° C. and 15 psi above atmospheric pressure for 172 seconds
xii) removal of pouches from retort
xiii) immediate rapid cooling in chilled water to stop cooking process.

It has been found that cauliflower rice prepared according to the method of the the invention has a texture and mouth feel which is similar to rice, but with a significantly reduced smell and taste compared to untreated cauliflower in the form of rice-shaped granules. Furthermore, the sealed packages have a shelf life of at least 3 month, suitably at least 6 months, suitably at least 12 months.

The invention claimed is:

1. A method for processing a vegetable which belongs in the species *Brassica oleracea*, the method comprising:
    i) a dicing step comprising subjecting the vegetable to mechanical size reduction;
    ii) a softening step performed subsequent to the dicing step, wherein the softening step comprises heating or freezing the vegetable for a pre-determined period; and
    iii) a treatment step comprising bringing the softened vegetable into contact with one or more reactive oxygen species selected from peroxides and superoxides.

2. A method according to claim 1, wherein the softening step comprises a method of heating selected from the group consisting of baking, frying, steaming, boiling, blanching or microwaving the vegetable.

3. A method according to claim 2, wherein the softening step comprises dry frying the vegetable.

4. A method according to claim 2, wherein the softening step comprises blanching the vegetable.

5. A method according to claim 1, wherein the reactive oxygen species is hydrogen peroxide.

6. A method according to claim 1, wherein the method further includes a washing step prior to the dicing step.

7. A method according to claim 6, wherein the washing step includes contacting the vegetable with an anti-microbial composition, followed by a rinsing step.

8. A method according to claim 1, wherein the method further includes a cooking step in which the treated vegetable is heated at a pre-determined temperature for a pre-determined time.

9. A method according to claim 8 in which the cooking step is followed by a rapid cooling step in which the cooked vegetable is rapidly cooled to stop the cooking process.

10. A method according to claim 1, wherein the method further includes a packaging step in which the treated vegetable is sealed within a food grade package.

11. A processed vegetable prepared according to the method of claim 1.

12. A method according to claim 1 in which the vegetable is selected from the group consisting of cabbage, brussels sprouts, kale, broccoli, and collard greens.

* * * * *